(12) United States Patent
Lu et al.

(10) Patent No.: US 8,140,716 B2
(45) Date of Patent: Mar. 20, 2012

(54) METHOD AND SYSTEM FOR IMPLEMENTING AUTOMATIC INSTALLATION OF KEY DEVICE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 439 days.

(21) Appl. No.: 12/437,152

(22) Filed: May 7, 2009

(65) Prior Publication Data

US 2010/0082843 A1 Apr. 1, 2010

(30) Foreign Application Priority Data

Sep. 28, 2008 (CN) .......................... 2008 1 0223248

(51) Int. Cl.
*G06F 3/00* (2006.01)
*G06F 13/12* (2006.01)
*G06F 13/38* (2006.01)
*G06F 13/00* (2006.01)

(52) U.S. Cl. ................. 710/10; 710/5; 710/67; 710/104

(58) Field of Classification Search .................. None
See application file for complete search history.

(56) References Cited

U.S. PATENT DOCUMENTS 6,704,824 B1 * 3/2004 Goodman ..................... 710/300
7,865,351 B2 * 1/2011 Mardiks ........................ 710/67

* cited by examiner

*Primary Examiner* — Eron J Sorrell
*Assistant Examiner* — Dayton Lewis-Taylor
(74) *Attorney, Agent, or Firm* — Harness, Dickey & Pierce, P.L.C.

(57) ABSTRACT

The invention discloses a method and system for implementing automatic installation of a key device, and relates to the field of smart card. The method includes steps of: establishing, by the key device, a connection with a computer; declaring to the computer that the key device itself is a compound device containing a USB keyboard device; sending a predefined first keyboard message sequence to the computer, wherein the first keyboard message sequence is used for starting an operation environment of the computer; converting, after the operation environment is started, a pre-stored script instruction for running an installation program into a second keyboard message sequence, and sending the second keyboard message sequence to the computer; sending a predefined third keyboard message sequence to the computer, wherein the third keyboard message sequence is used for running the installation program. The system includes a key device and a computer. According to the invention, by way of interaction between the key device and the computer, the technical problem that the key device can not be installed automatically in the case that the autorun function of the Windows system is shielded is solved, thereby facilitating automatic installation of the key device.

15 Claims, 6 Drawing Sheets

METHOD AND SYSTEM FOR IMPLEMENTING AUTOMATIC INSTALLATION OF KEY DEVICE

CROSS-REFERENCE TO RELATED APPLICATIONS

The application claims priority to Chinese Patent Application No. 200810223248.9 filed Sep. 28, 2008, the contents of which are hereby incorporated by reference in its entirety.

FIELD OF THE INVENTION

The invention relates to the field of smart card, and particularly to a method and system for implementing automatic installation of a key device.

BACKGROUND OF THE INVENTION

A .bat file is a type of batch processing file (also called a batch processing program or a script), is a text file without a regular format, and includes one or more instructions. The system calls a Cmd.exe file and runs instructions contained in the batch processing file one by one according to their occurrence sequence if the name of the batch processing file is typed into the command prompt or the batch processing file is double-clicked. Daily operations or repeated tasks can be simplified by using a batch processing file. Although a batch processing program is run in a command line environment, not only command line software but also any 32-bits Windows program can be run in a batch processing file.

An automatic running function (hereinafter referred to as "autorun") is an inherent function of the USB (Universal Serial BUS)-SCSI (Small Computer Standard Interface), which makes operating an optical disc easier. In general, this type of automatic running program is called an autorun program. Thus, when a device containing an autorun program is connected to a computer, the operation system of the computer, such as the Windows, automatically calls the automatic running program and thereby realizing the automatic running function.

With the rapid development of computer and internet techniques, the internet provides great convenience to our daily life, working and study, so that many activities are made to be carried out over the internet.

However, the occurrence of viruses (such as an autorun virus) and hackers greatly threatens various activities in the internet, while the autorun function supported by a computer operation system gives chances to these threats and even becomes an accessory of the hackers. Therefore, taking safety and the like into consideration, many subscribers or Windows safety protection programs often shield the autorun function of the Windows operation system. However, shielding the autorun function of the Windows operation system may result in some problems in running some devices. For example, an autorun-type key device can not be installed automatically, and it is required to be installed manually, which leads to unnecessary wastes of time and energy.

SUMMARY OF THE INVENTION

In order to solve the problem that an autorun-type key device can not be installed automatically when the autorun function is shielded from the operation system, the invention provides a method and system for implementing automatic installation of a key device, and the specific solutions are as follows.

According to an aspect, the invention provides a method for implementing automatic installation of a key device, including steps of:
  establishing, by the key device, a connection with a computer;
  declaring, by the key device, to the computer that the key device itself is a compound device containing a USB keyboard device;
  sending, by the key device, a predefined first keyboard message sequence to the computer, wherein the first keyboard message sequence is used for starting an operation environment of the computer;
  converting, by the key device after the operation environment is started, a pre-stored script instruction for running an installation program into a second keyboard message sequence, and sending the second keyboard message sequence to the computer;
  sending, by the key device, a predefined third keyboard message sequence to the computer, wherein the third keyboard message sequence is used for running the installation program.

Specifically, when executing an application after the running of the installation program is finished, the method further includes steps of:
  sending, by the computer, a device type switching instruction to the key device;
  switching, by the key device upon receiving the device type switching instruction, its device descriptor to a device descriptor required for a normal operation;
  reporting, by the key device, to the computer a message that a device for a normal operation is inserted, declaring that the key device itself is a device corresponding to the message that the device for the normal operation is inserted, and going into a normal operation mode.

Specifically, the compound device containing the USB keyboard device includes:
  the USB keyboard device and an optical disc device, or
  the USB keyboard device and a USB mass storage device, or
  the USB keyboard device and a key device.

Specifically, the key device includes:
  a USB key device, or an Human Interface Device (HID) key device, or an SCSI key device, or a Chip/Smart Card Interface Devices (CCID) key device.

Specifically, the device type switching instruction is a predetermined instruction being receivable by the compound device, and the device type switching instruction is an optical disc ejection instruction if the compound device comprises a USB keyboard device and an optical disc device; and
  the device type switching instruction is a keyboard light status setting instruction if the compound device comprises a USB keyboard device and a key device.

Specifically, the predefined first keyboard message sequence includes:
  a keyboard message sequence converted from an instruction for trying to start a command line operation mode; or
  a keyboard message sequence converted from an instruction for starting a batch processing running environment.

Specifically, the pre-stored script instruction for running the installation program comprises:
  a command line instruction for trying to run the installation program; or
  a batch processing script for trying to run the installation program; or
  binary codes compiled from the installation program; or a command line instruction for opening a browser and accessing a URL.

Specifically, if the pre-stored script instruction for running the installation program is a command line instruction for trying to run the installation program, then:

after the declaring, by the key device, to the computer that the key device itself is a compound device containing a USB keyboard device, the method further comprises:

determining, by the key device, whether running of the installation program is finished by an autorun program, and if so, the computer sends a device type switching instruction to the key device, and the key device switches, upon receiving the device type switching instruction, its device descriptor to the device descriptor required for the normal operation, reports to the computer a message that a device required for the normal operation is inserted, declaring that the key device itself is a device corresponding to the message that the device for the normal operation is inserted, and going into a normal operation mode;

otherwise, a subsequent step that the key device sends the predefined first keyboard message sequence to the computer is executed.

Specifically, the predefined third keyboard message sequence is a keyboard message sequence changed from the script trying to activate the installation program, including:

a keyboard message sequence compiled by the "enter" keyboard device command; or a keyboard message sequence converted from a command for running the installation program, with a script for trying to activate the installation program being stored in the computer.

According to another aspect, the invention provides a system for implementing automatic installation of a key device, wherein the system includes a key device and a computer;

the key device comprises a communication unit, a declaring unit, a storing unit and a sending unit, wherein the communication unit is for the key device to establish a connection with the computer;

the declaring unit is for the key device to declare to the computer that the key device itself is a compound device containing a USB keyboard device;

the storing unit is for pre-storing a script instruction for running an installation program; and the sending unit is for the key device to send a predefined first keyboard message sequence to the computer, wherein the predefined first keyboard message sequence is used for starting an operation environment of the computer; and for the key device to convert the script instruction for running the installation program pre-stored in the storing unit into a second keyboard message sequence, and to send the second keyboard message sequence to the computer; and for the key device to send a predefined third keyboard message sequence to the computer, wherein the third keyboard message sequence is used for running the installation program; and the computer comprises a communication unit, a receiving unit and a processing unit, wherein the communication unit is for the computer to establish a connection with the key device;

the receiving unit is for receiving the first keyboard message sequence, the second keyboard message sequence and the third keyboard message sequence sent by the sending unit of the key device; and the processing unit is for executing corresponding operations according to the keyboard message sequences received by the receiving unit.

Specifically, the storing unit is for storing a command line instruction for trying to run the installation program; or for storing a batch processing script for trying to run the installation program; or for storing binary codes compiled from the installation program; or for storing a command line instruction for opening a browser and accessing a URL.

Specifically, if the command line instruction for trying to run the installation program is stored in the storing unit, the key device further comprises a determining unit for determining whether running of the installation program is finished.

Specifically, the determining unit is for determining whether the running of the installation program is finished by an autorun program, wherein if a predetermined first installation finished message is received within a predetermined first time period before the sending unit sends a first keyboard message sequence, it is determined that the running of the installation program is finished by the autorun program; and for determining whether the running of the installation program is finished by the keyboard message sequence, wherein if a predetermined second installation finished message is received within a predetermined second time period after the sending unit sends the first keyboard message sequence, it is determined that the installation program is finished by the keyboard message sequence.

Specifically, the key device further includes:

a switching unit for switching, upon receiving a device type switching instruction sent by the computer, a device descriptor of the key device to a device descriptor required for a normal operation when executing an application after the running of the installation program is finished; and a reporting unit for reporting to the computer a message that a device for a normal operation is inserted, and declaring to the computer that the key device itself is a device corresponding to the message that the device for the normal operation is inserted.

Advantageous effects of the technical solutions provided by the embodiments according to the invention are as follows:

By way of interaction between the key device and the computer, the technical problem that the key device can not be installed automatically in the case that the autorun function of the Windows system is shielded is solved, thereby facilitating automatic installation of the key device.

DETAILED DESCRIPTION OF THE EMBODIMENTS

In order to make the objects, technical solutions and advantageous effects clearer, further detailed description of the embodiments of the invention will be provided as follows.

In the following embodiments, the confirmation key (i.e. the Enter key) in a keyboard is referred to as "enter", the windows image key is referred to as "windows". Specifically, a combined key resulted from pressing down any two keys at one time, such as triggering the key "A" and the key "B" at one time, is referred to as A+B.

A skilled person in the art shall know that a complete keyboard message sequence is a sequence composed of three message codes, which include a Make code, a scan code and a Break code respectively.

For example, when a combined key, such as A+B, is pressed down, the corresponding keyboard message is: Make code-Make code-"A" scan code-"B" scan code-Break code-Break code.

In detail, in the following embodiments, a method for converting a script into a keyboard message sequence includes steps of:

In step 1, characters in the script are mapped into corresponding scan codes.

In step 2, if a single key is to be converted, a Make code and a Break code are respectively added in front of and behind the scan code; if a combined key is to be converted, a corresponding number of Make codes and Break codes are respectively added in front of and behind the scan code sequence.

In step 3, if there is still a key to be converted, go to Step 2; otherwise, conversion is finished.

Embodiment 1

Figure 1:
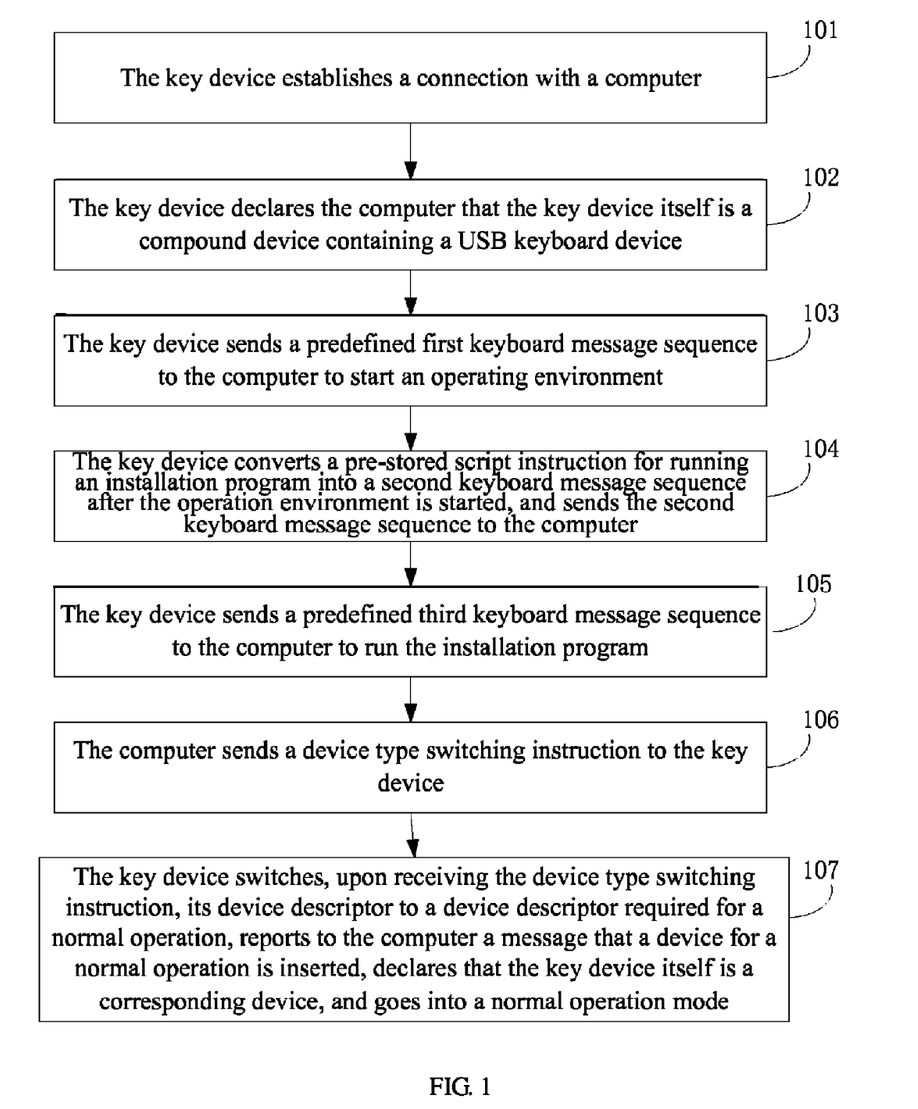
FIG. 1 is a flow chart illustrating a method for implementing automatic installation of a key device according to an embodiment 1 of the present invention.

In order to solve the problem that the key device can not be installed automatically in the case that the autorun function of the Windows system is shielded, the present invention provides a method for implementing automatic installation of a key device. With reference to FIG. 1, the method includes steps as follows:

Step 101: the key device establishes a connection with a computer.

Step 102: the key device declares to the computer that the key device itself is a compound device containing a USB keyboard device.

Specifically, in practice, the compound device containing the USB keyboard device includes:

the USB keyboard device and an optical disc device, or the USB keyboard device and a USB mass storage device, or the USB keyboard device and a key device.

Here, it is required to be noticed that, when the compound device containing a USB keyboard device includes the USB keyboard device and a key device, the communication protocol between the key device and the computer may utilize an existing USB-based protocol, such as HID, SCSI, CCID etc., and may also utilize a self-defined USB protocol. Correspondingly, the key device may be an HID device, an SCSI device, a CCID device or a self-defined USB device.

Step 103: the key device sends a predefined first keyboard message sequence to the computer to start an operating environment.

Specifically, the predefined first keyboard message sequence may be: a keyboard message sequence converted from an instruction for trying to start a command line operation mode; or a keyboard message sequence converted from an instruction for starting a batch processing running environment.

Step 104: the key device converts a pre-stored script instruction for running an installation program into a second keyboard message sequence after the operation environment is started, and sends the second keyboard message sequence to the computer.

Specifically, the script instruction may be: a command line instruction for trying to run the installation program; or a batch processing script for trying to run the installation program; or binary codes compiled from the installation program; or a command line instruction for opening a browser and accessing a URL.

Step 105: the key device sends a predefined third keyboard message sequence to the computer to run the installation program.

Specifically, the third keyboard message sequence may be: a keyboard message sequence converted from a "enter" command; or a keyboard message sequence converted from a command for running the installation program, with the above described script being stored in the computer.

Further, when executing an application after the running of the installation program is finished, and after the step 105, the method further includes:

Step 106: the computer sends a device type switching instruction to the key device.

The device type switching instruction is a predetermined instruction being receivable by the compound device. For example, for a compound device including a USB keyboard device and an optical disc device, the device type switching instruction preferably is an optical disc ejection instruction; and for a compound device including a USB keyboard device and a key device, the device type switching instruction is a keyboard light status setting instruction.

Step 107: the key device switches, upon receiving the device type switching instruction, its device descriptor to a device descriptor required for a normal operation, reports to the computer a message that a device for a normal operation is inserted, declares that the key device itself is a corresponding device, and goes into a normal operation mode.

Specifically, the device required for a normal operation includes an HID device, a CCID device or an SCSI device.

It shall be particularly noticed that, when the second keyboard message sequence in step 104 is converted from a pre-stored command line instruction for trying to run an installation program, after the step 102 and before the step 103, the method according to the embodiment of the invention further includes:

Determining whether the running of the installation program is finished by the autorun program, wherein if the key device receives a predetermined installation finished message within a predetermined time period, it is determined that the running of the installation program is able to be finished by the autorun, then go to step 106; otherwise, go to step 103.

To sum up, according to the method provided by the embodiment of the invention, by way of interaction between the key device and the computer, the technical problem that the key device can not be installed automatically in the case that the autorun function of the Windows system is shielded is solved, thereby facilitating automatic installation of the key device.

The embodiments of the invention are described in detail with reference to the following embodiments.

Embodiment 2

Figure 2:
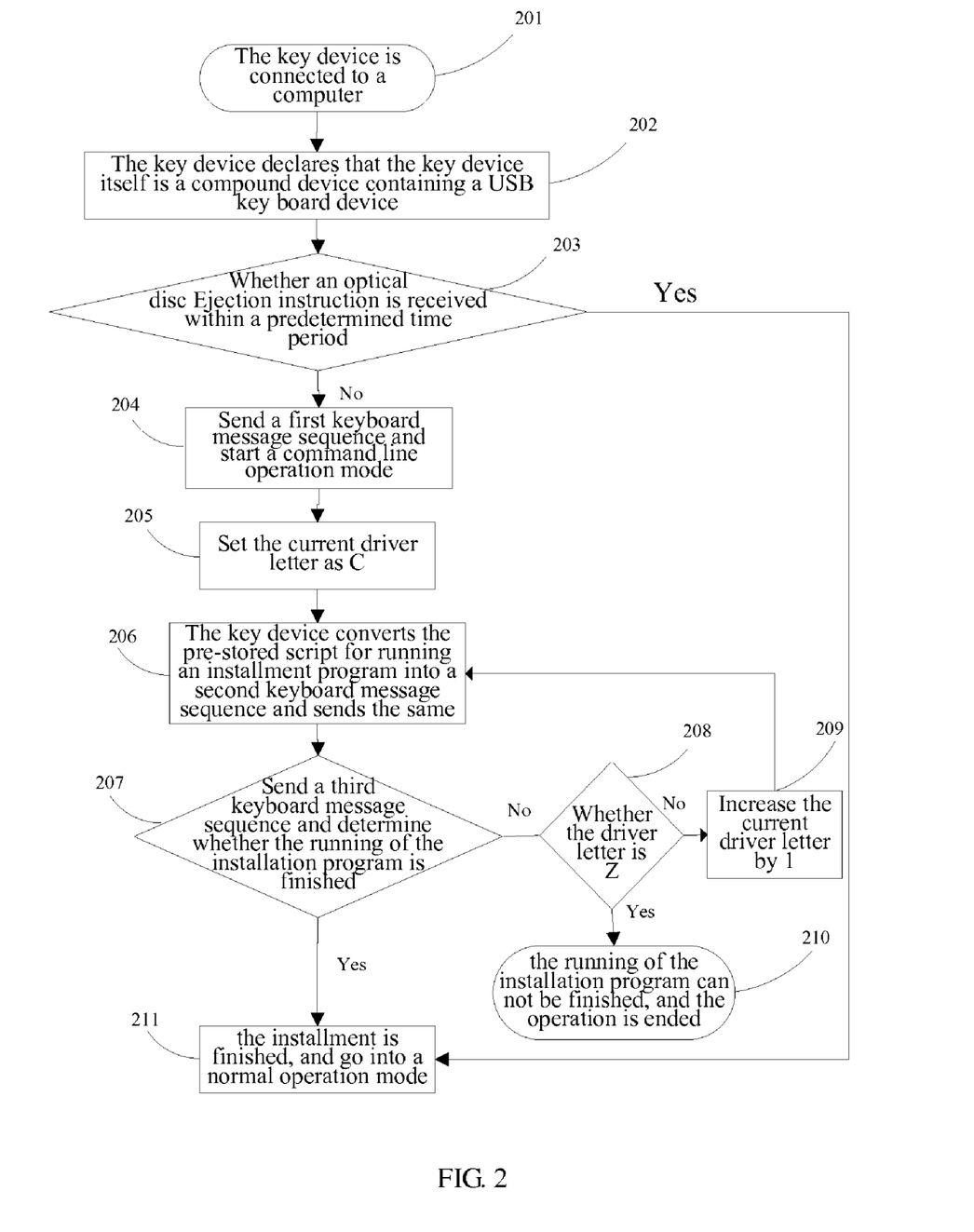
FIG. 2 is a flow chart illustrating a method for implementing automatic installation of a key device according to an embodiment 2 of the present invention.

With reference to FIG. 2, a method for implementing automatic installation of a key device is provided in this embodiment, wherein the key device is a compound device including a USB keyboard device and an optical disc device, and the script stored in the key device is a command line instruction for trying to run an installation program. Because the compound device being composed of a USB keyboard device and an optical disc device is taken as an example, an optical disc image of an ISO format is stored in the key device, wherein an autorun.inf and an installation program required by the autorun program is contained within the optical disc image. After being finished, the installation program sends a predetermined installation finished message to the key device USB Key. Preferably, in the embodiment, the message is an optical disc ejection instruction.

The method includes the following steps.

Step 201: the key device USB Key is connected to a computer.

Step 202: the key device USB Key declares to the computer that the key device itself is a compound device containing a USB keyboard device.

As described above, the compound device including an optical disc and a USB keyboard device is taken as an example in this embodiment.

Step 203: the key device USB Key waits for receiving an optical disc ejection instruction, and if the key device receives the instruction within a predetermined time period, it is determined that the installation program is finished by the autorun program, and go to step 211; otherwise, go to step 204.

To facilitate description of this embodiment, the predetermined time period is taken as 30 seconds.

Step 204: the key device USB Key sends a first keyboard message sequence to the computer and starts a command line operation mode.

Specifically, the first keyboard message sequence is:

```
// open the "running" window of the operating system of the computer
"windows"+r
// start the command line operation mode
cmd
"enter"
```

Step 205: the key device USB Key sets the current driver letter as C.

Step 206: the key device USB Key converts the stored script instruction into a second keyboard message sequence. If the driver letter in the operation instruction is not consistent with the current driver letter, the driver letter in the operation instruction is replaced by the current driver letter, and the converted second keyboard message sequence is sent to the computer.

Specifically, the script stored in the key device USB Key is a command line instruction for trying to run an installation program, such as:

C:\GUID\setup.exe/l

Specifically, the GUID is a predetermined directory name, and the setup.exe is a predetermined installation program name, and the l is a predetermined parameter for identifying the installation program to be run. In practice, a part of the directory name, the installation program name and the parameter can be used. Preferably, in this embodiment, the directory name, the installation program name, and the parameter are used.

Step 207: the key device USB Key sends a keyboard message sequence of "enter" to the computer (here, the keyboard message sequence is called a third keyboard message sequence), tries to start an installation program and waits for an optical disc ejection instruction. If the instruction is received within a predetermined time period, then go to step 211, otherwise, go to step 208.

To facilitate description of this embodiment, the predetermined time period is taken as 30 seconds.

Step 208: the key device USB Key determines whether the current driver letter is Z, if so, go to step 210; otherwise, go to step 209.

Step 209: the USB Key device incrementally increases the current driver letter, then go to step 206.

Step 210: the running of the installation program of the key device USB Key can not be finished, and the operation is ended.

Step 211: after the installation program is finished, upon receiving the disc ejection instruction, the key device USB Key switches its device descriptor to a device descriptor required for a normal operation (such as an HID device descriptor), reports a device insertion message to the computer, declares that the key device itself is a corresponding device, and goes into a normal operation mode.

To sum up, according to the method provided by the embodiment of the invention, by way of interaction between the key device and the computer, the technical problem that the key device can not be installed automatically in the case that the autorun function of the Windows system is shielded is solved, thereby facilitating automatic installation of the key device.

Embodiment 3

Figure 3:
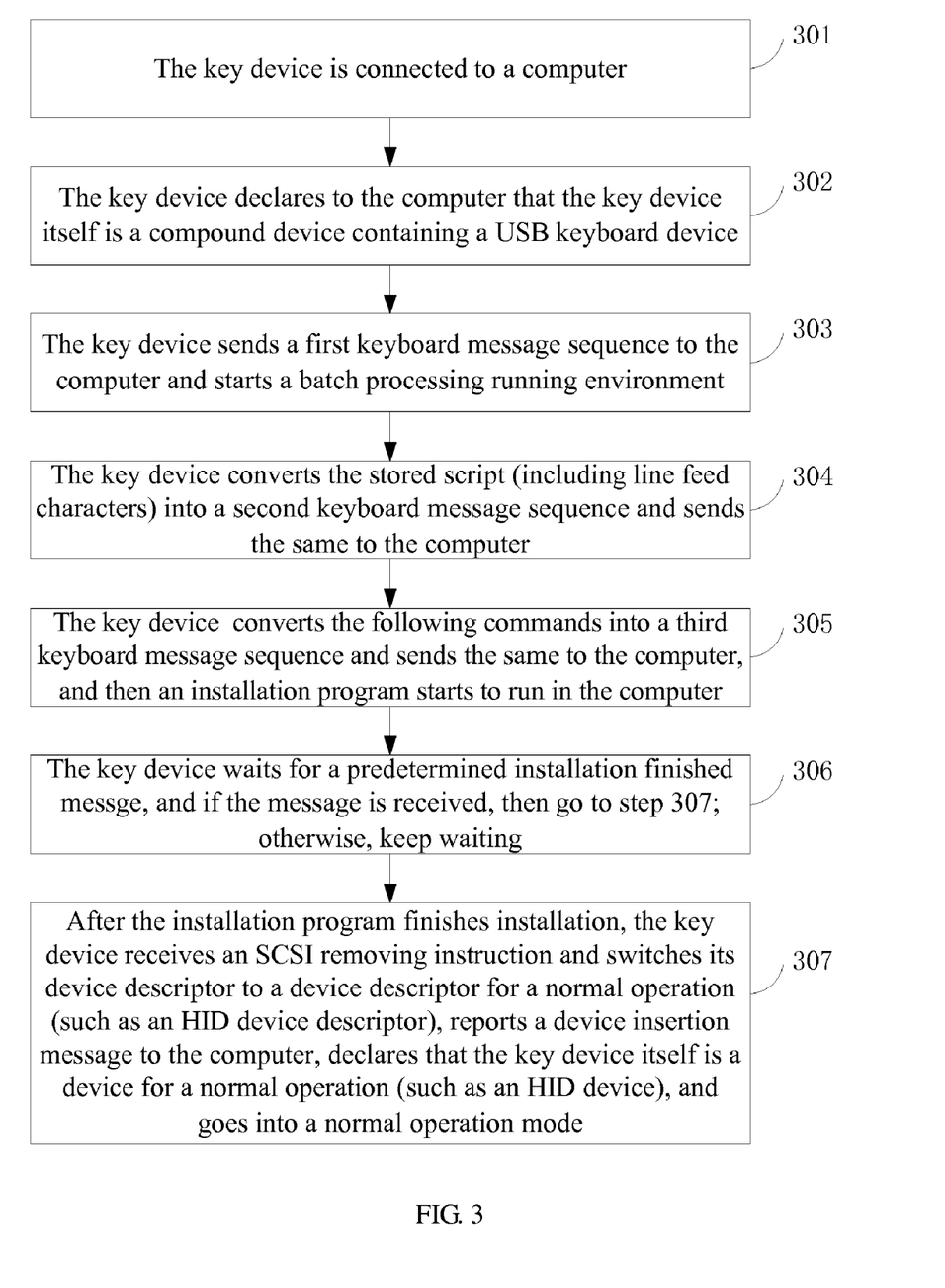
FIG. 3 is a flow chart illustrating a method for implementing automatic installation of a key device according to an embodiment 3 of the present invention.

With reference to FIG. 3, a method for implementing automatic installation of a key device is provided in this embodiment, wherein the key device is a compound device including a USB keyboard device and a USB mass storage device, and the script stored in the key device is a batch processing script for trying to run the installation program. The method includes the following steps.

Step 301: the key device USB Key is connected to a computer.

Step 302: the key device USB Key declares to the computer that the key device itself is a compound device containing a USB keyboard device.

In this embodiment, the compound device includes a USB keyboard device and a USB mass storage device.

Step 303: the key device USB Key sends a first keyboard message sequence to the computer and starts a batch processing running environment.

Specifically, the first keyboard message sequence is:

```
// open the "running" window
"windows"+r
// start the command line operation mode
cmd
"enter"
// go to the root directory of the current driver in order to avoid a possible privilege control
// cd c:\ can also be used
// Cd V/ to avoid problems resulted from the absence of the C disc
Cd V/
"enter"
echo
```

Step 304: the key device USB Key converts the stored script (including line feed characters contained therein) into a second keyboard message sequence and sends the same to the computer.

Specifically, the installation program, and the batch processing script for traversing drivers and trying to run the installation program are stored in the key device USB Key, wherein an example of the stored batch processing script for trying to run the installation program is as follows:

```
@echo off
setlocal enabledelayedexpansion
wmic logicaldisk get name,DriveType | more +1 >>temp.txt
for /f "tokens=1,2" %%a in (temp.txt) do if exist %%b\GUID\setup.exe  start %%b\GUID\setup.exe /1
del temp.txt
```

Specifically, the GUID is a predetermined directory name, and the setup.exe is a predetermined installation program name, and the 1 is a predetermined parameter for identifying the installation program to be run. In practice, a part of the directory name, the installation program name and the parameter can be used. Preferably, in this embodiment, the directory name, the installation program name, and the parameter are used. It shall be particularly noticed that, when storing the script into the USB Key, the line feed characters contained in the script shall also be stored.

Step 305, the key device USB Key converts the following commands into a third keyboard message sequence and sends the same to the computer, and then an installation program starts to run in the computer.

Specifically, the third keyboard message sequence is:

```
// store the script in the current directory
> setup.bat
"enter"
// run the installation script
setup.bat
"enter"
```

Step 306, the key device USB Key waits for a predetermined installation finished message, and if the message is received, then go to step 307; otherwise, keep waiting.

Step 307, after the installation program finishes installation, the key device USB Key receives an SCSI removing instruction and switches its device descriptor to a device descriptor for a normal operation (such as an HID device descriptor), reports a device insertion message to the computer, declares that the key device itself is a device for a normal operation (such as an HID device), and goes into a normal operation mode.

To sum up, according to the method provided by the embodiment of the invention, by way of interaction between the key device and the computer, the technical problem that the key device can not be installed automatically in the case that the autorun function of the Windows system is shielded is solved, thereby facilitating automatic installation of the key device.

Embodiment 4

Figure 4:
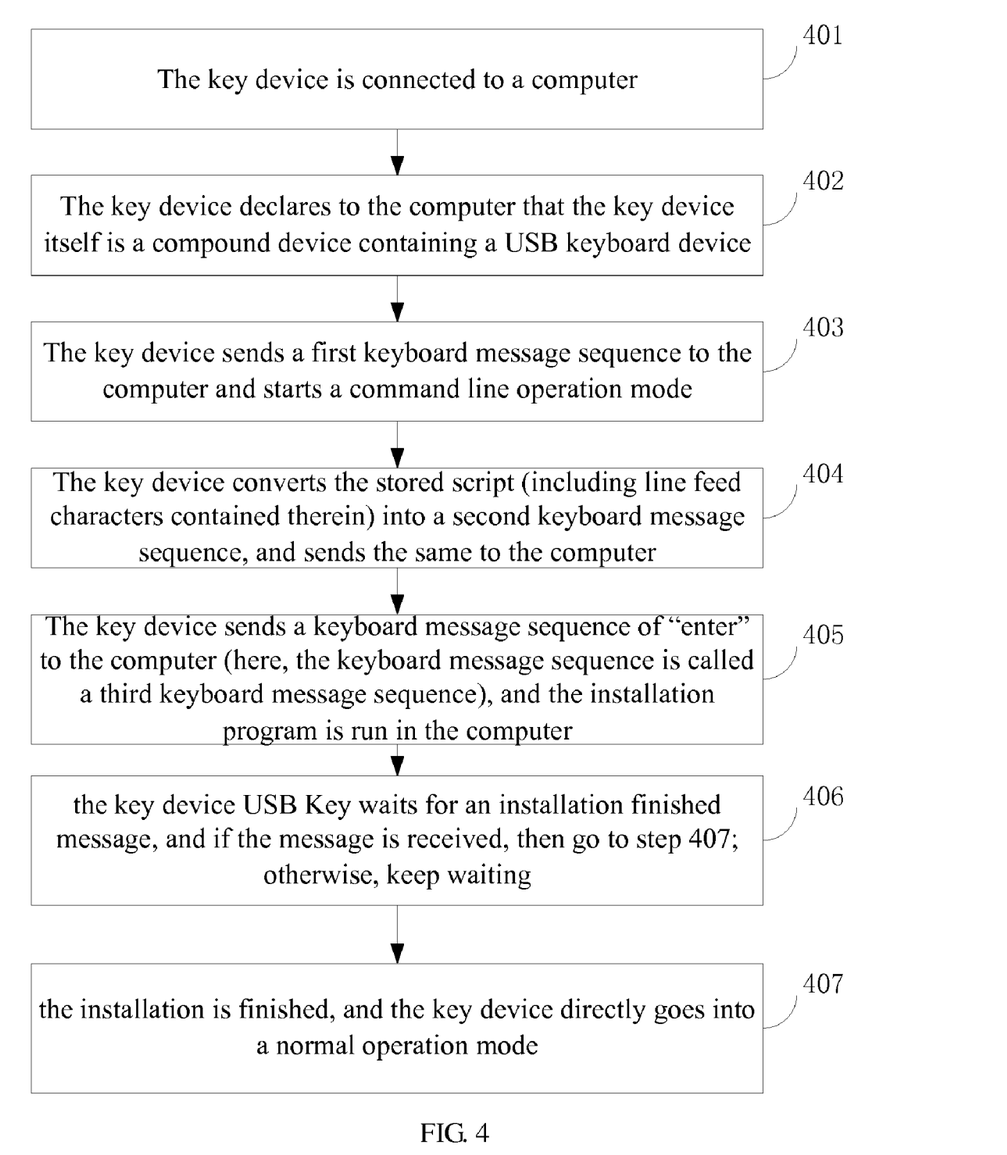
FIG. 4 is a flow chart illustrating a method for implementing automatic installation of a key device according to an embodiment 4 of the present invention.

With reference to FIG. 4, a method for implementing automatic installation of a key device is provided in this embodiment, wherein the key device is a compound device including a USB keyboard device and an HID key device, and the script stored in the key device is binary codes compiled from the installation program. The method includes the following steps.

Step 401: the key device USB Key is connected to a computer.

Step 402: the key device USB key declares to the computer that the key device itself is a compound device containing a USB keyboard device.

Specifically, in this embodiment, the compound device includes a USB keyboard device and an HID key device. A skilled person in the art shall know that the communication protocol between the key device and the computer may utilize an existing USB-based protocol, such as HID, SCSI, CCID etc., and may also utilize a self-defined USB protocol, and correspondingly, the key device may be reported as an HID device, an SCSI device, a CCID device or a self-defined USB device. In this embodiment, the key device is reported as an HID device, i.e. the compound device includes a USB keyboard device and an HID key device.

Step 403: the key device USB Key sends a first keyboard message sequence to the computer and starts a command line operation mode.

In this embodiment, the "enter" key in the keyboard is referred to as "enter", and the first keyboard message sequence is:

```
// open the "running" window
"windows" +r
// start the command line operation mode
cmd
"enter"
```

Step 404: the key device USB Key converts the stored script into a second keyboard message sequence, and sends the same to the computer.

Specifically, the script stored in the USB Key is binary codes compiled from the installation program. In this embodiment, the installation program is setup.exe. The binary codes of the installation program setup.exe can be obtained from a VBscript script as follows:

```
fp=wscript.arguments(0)
fn=right(fp,len(fp)-instrrev(fp,"\"))
with createobject("adodb.stream")
.type=1:.open:.loadfromfile fp:str=.read:sl=lenb(str)
end with
sll=sl mod 65536:slh=sl\65536
with createobject("scripting.filesystemobject").opentextfile(fp&".bat",2,true)
.write "@echo str="""""
for i=1 to sl
bt=ascb(midb(str,i,1))
if bt<16 then .write "0"
.write hex(bt)
if i mod 128=0 then .write """"_>>debug.vbs"+vbcrlf+"@echo+"""""
next
.writeline """">>debug.vbs"+vbcrlf+"@echo with wscript.stdout:r=vbcrlf"_+":for i=1 to len(str) step 48:.write """e""+hex(256+(i-1)/2)"_+":for j=i to i+46 step 2:.write """ ""+mid(str,j,2):next:.write r:next>>debug.vbs".writeline "@echo .write ""rbx""+r+"""""+hex(slh)+""""+r+""rcx""+r+"""""+hex(sll)_+""""+r+""n debug.tmp""""+r+""w""+r+""q""+r:end with"_+">>debug.vbs&&cscript //nologo debug.vbs|debug.exe>nul&&ren debug.tmp"""""&fn&""""&del debug.vbs"
end with
```

Save the above codes as a script file ending with .vbs (such as transfer.vbs).

Correspondingly, the script is run in a command line mode: cscript transfer.vbs setup.exe After running is finished, binary codes can be obtained in a newly constructed file named seup.exe.bat. The binary codes are stored into the key device USB Key.

A skilled person in the art shall know that in addition to utilizing the VB script, a directly started debug.exe file can also be utilized.

Step 405, the key device USB Key sends a keyboard message sequence of "enter" to the computer (here, the keyboard message sequence is called a third keyboard message sequence), and the installation program is run in the computer.

Step 406, the key device USB Key waits for an installation finished message, and if the message is received, then go to step 407; otherwise, keep waiting.

Step 407, the installation is finished, and the key device directly goes into a normal operation mode.

To sum up, according to the method provided by the embodiment of the invention, by way of interaction between the key device and the computer, the technical problem that the key device can not be installed automatically in the case that the autorun function of the Windows system is shielded is solved, thereby facilitating automatic installation of the key device.

Embodiment 5

Figure 5:
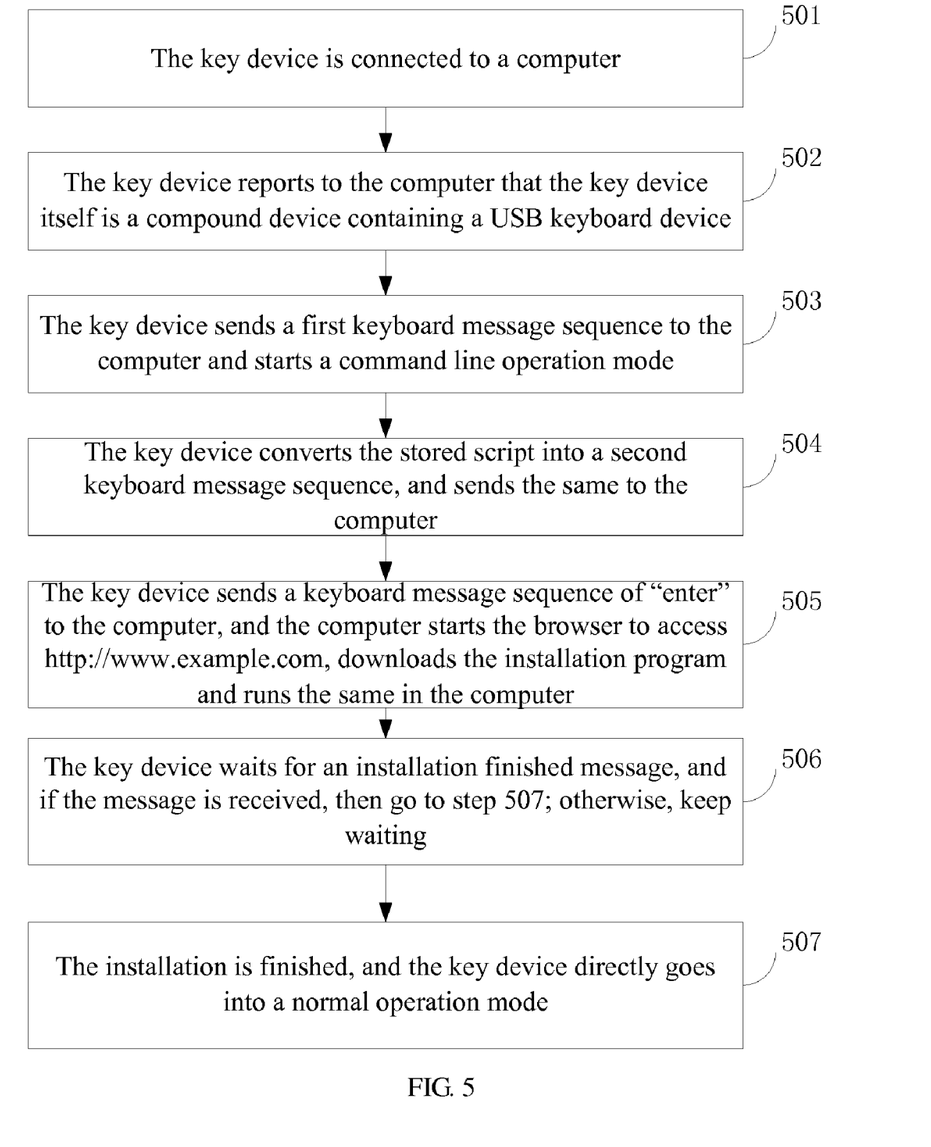
FIG. 5 is a flow chart illustrating a method for implementing automatic installation of a key device according to an embodiment 5 of the present invention.

With reference to FIG. 5, a method for implementing automatic installation of a key device is provided in this embodiment, wherein the key device is a compound device including a USB keyboard device and a USB key device, and the script stored in the key device is a command line instruction for opening a browser and accessing a URL. The method includes the following steps.

Step 501: the key device USB Key is connected to a computer.

Step 502: the key device USB key reports to the computer that the key device itself is a compound device containing a USB keyboard device.

In this embodiment, the compound device includes a USB keyboard device and a USB key device. The communication protocol between the key device and the computer may utilize an existing USB-based protocol, such as HID, SCSI, CCID etc., and may also utilize a self-defined USB protocol. Correspondingly, the key device may be reported as an HID device, an SCSI device, a CCID device or a self-defined USB device. Preferably, in this embodiment, the key device is reported as a USB device.

Step 503: the key device USB Key sends a first keyboard message sequence to the computer and starts a command line operation mode.

Specifically, the first keyboard message sequence is:

```
// open the "running" window
"windows" +r
// start the command line operation mode
cmd
"enter"
```

Step 504: the key device USB Key converts the stored script into a second keyboard message sequence, and sends the same to the computer.

Specifically, the script stored in the USB Key device is a command line instruction for opening a browser and accessing a URL, such as:
explorer http://www.example.com Specifically, the http://www.example.com is a webpage address in which a control for automatically downloading and running an installation program is embedded. The control called by the webpage is as follows:

```
<object CLASSID='clsid:4DE03A9C-D725-4514-84BA-
6A7388E8FC42' CODEBASE='files/install.cab#Version=1,00,0000'
BORDER=0 VSPACE=0 HSPACE=0 ALIGN=TOP HEIGHT=0%
WIDTH=0%></object>
```

Specifically, the install.cab is the installation program.

Step 505: the key device USB Key sends a keyboard message sequence of "enter" to the computer (here, the keyboard message sequence is called a third keyboard message sequence), and the computer starts the browser and accesses http://www.example.com, downloads the installation program and runs the same in the computer.

Step 506, the key device USB Key waits for an installation finished message, and if the message is received, then go to step 507; otherwise, keep waiting.

Step 507, the installation is finished, and the key device directly goes into a normal operation mode.

To sum up, according to the method provided by the embodiment of the invention, by way of interaction between the key device and the computer, the technical problem that the key device can not be installed automatically in the case that the autorun function of the Windows system is shielded is solved, thereby facilitating automatic installation of the key device.

Embodiment 6

Figure 6:
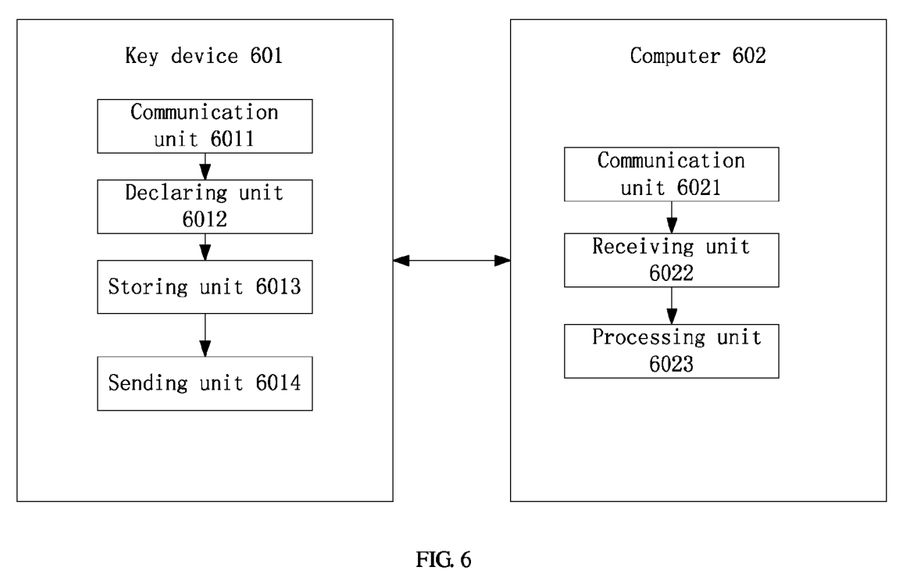
FIG. 6 is a diagram illustrating a system for implementing automatic installation of a key device according to an embodiment 6 of the present invention.

With reference to FIG. 6, a system for implementing automatic installation of a key device is provided in this embodiment, including a key device 601 and a computer 602.

The key device 601 includes a communication unit 6011, a declaring unit 6012, a storing unit 6013 and a sending unit 6014.

The communication unit 6011 is for the key device 601 to establish a connection with the computer 602.

The declaring unit 6012 is for the key device 601 to declare to the computer 602 that the key device itself is a compound device containing a USB keyboard device.

The storing unit 6013 is for pre-storing a script instruction for running an installation program.

The sending unit 6014 is for the key device 601 to send a predefined first keyboard message sequence to the computer 602, wherein the predefined first keyboard message sequence is used for starting an operation environment of the computer 602; and for the key device 601 to convert the script instruction for running the installation program pre-stored in the storing unit 6013 into a second keyboard message sequence, and to send the second keyboard message sequence to the computer 602; and for the key device 601 to send a predefined third keyboard message sequence to the computer 602, wherein the third keyboard message sequence is used for running the installation program.

The computer 602 includes a communication unit 6021, a receiving unit 6022 and a processing unit 6023.

The communication unit 6021 is for the computer 602 to establish a connection with the key device 601.

The receiving unit 6022 is for receiving the first keyboard message sequence, the second keyboard message sequence and the third keyboard message sequence sent by the sending unit 6014 of the key device 601.

The processing unit 6023 is for executing corresponding operations according to the keyboard message sequences received by the receiving unit 6022.

Specifically, the storing unit 6013 is for storing a command line instruction for trying to run the installation program; or for storing a batch processing script for trying to run the installation program; or for storing binary codes compiled from the installation program; or for storing a command line instruction for opening a browser and accessing a URL.

If the command line instruction for trying to run the installation program is stored in the storing unit 6013, the key device 601 further includes:

a determining unit for determining whether running of the installation program is finished.

Specifically, the determining unit is for determining whether the running of the installation program is finished by an autorun program, wherein if a predetermined first installation finished message is received within a predetermined first time period before the sending unit 6014 sends a first keyboard message sequence, it is determined that the running of the installation program is finished by the autorun program; and for determining whether the running of the installation program is finished by the keyboard message sequence, wherein if a predetermined second installation finished message is received within a predetermined second time period after the sending unit 6014 sends the first keyboard message sequence, it is determined that the installation program is finished by the keyboard message sequence.

The key device 601 further includes:

a switching unit for switching, upon receiving a device type switching instruction sent by the computer 602, a device descriptor of the key device 601 to a device descriptor required for a normal operation when executing an application after the running of the installation program is finished (in practice, the device type switching instruction is a predetermined instruction being receivable by the compound device. For example, for a compound device including a USB keyboard device and an optical disc device, the device type switching instruction preferably is an optical disc ejection instruction; and for a compound device including a USB keyboard device and a key device, the device type switching instruction is a keyboard light status setting instruction); and a reporting unit for reporting to the computer 602 a message that a device for a normal operation is inserted, and declaring to the computer 602 that the key device itself is a device corresponding to the message that the device for the normal operation is inserted.

To sum up, according to the system provided by the embodiment of the invention, by way of interaction between the key device and the computer, the technical problem that the key device can not be installed automatically in the case that the autorun function of the Windows system is shielded is solved, thereby facilitating automatic installation of the key device.

The above description is only preferred embodiments of the invention, instead of a limitation to the invention. Any modification, equivalent substitution, and improvement devised within the spirit and principle of the invention shall fall into the scope of the invention.

The invention claimed is:

1. A method for implementing automatic installation of a key device, wherein the method comprises steps of:
    establishing, by the key device, a connection with a computer, wherein an autorun function is shielded from an operation system of the computer;
    declaring, by the key device, to the computer that the key device itself is a compound device containing a USB keyboard device;
    sending, by the key device, a predefined first keyboard message sequence to the computer, wherein the first keyboard message sequence is used by the computer for starting an operation environment of the computer;
    converting, by the key device after the operation environment is started, a pre-stored script instruction for running an installation program into a second keyboard message sequence, and sending the second keyboard message sequence to the computer;
    sending, by the key device, a predefined third keyboard message sequence to the computer, wherein the third keyboard message sequence is used by the computer for instructing to runn the installation program according to the second keyboard message sequence.

2. The method for implementing automatic installation of a key device of claim 1, wherein when executing an application after the running of the installation program is finished, the method further comprises steps of:
    sending, by the computer, a device type switching instruction to the key device;
    switching, by the key device upon receiving the device type switching instruction, its device descriptor to a device descriptor required for a normal operation;
    reporting, by the key device, to the computer a message that a device for a normal operation is inserted, declaring that the key device itself is a device corresponding to the message that the device for the normal operation is inserted, and going into a normal operation mode.

3. The method for implementing automatic installation of a key device of claim 1, wherein the compound device containing the USB keyboard device comprises:
    the USB keyboard device and an optical disc device, or
    the USB keyboard device and a USB mass storage device, or
    the USB keyboard device and a key device.

4. The method for implementing automatic installation of a key device of claim 3, wherein the key device comprises:
    a USB key device, or an HID key device, or an SCSI key device, or a CCID key device.

5. The method for implementing automatic installation of a key device of claim 2, wherein the device type switching instruction is a predetermined instruction being receivable by the compound device.

6. The method for implementing automatic installation of a key device of claim 5, wherein the device type switching instruction is an optical disc ejection instruction if the compound device comprises a USB keyboard device and an optical disc device; or the device type switching instruction is a keyboard light status setting instruction if the compound device comprises a USB keyboard device and a key device.

7. The method for implementing automatic installation of a key device of claim 1, wherein the predefined first keyboard message sequence comprises:
    a keyboard message sequence converted from an instruction for trying to start a command line operation mode; or
    a keyboard message sequence converted from an instruction for starting a batch processing running environment.

8. The method for implementing automatic installation of a key device of claim 1, wherein the pre-stored script instruction for running the installation program comprises:
    a command line instruction for trying to run the installation program; or a batch processing script for trying to run the installation program; or binary codes compiled from the installation program; or a command line instruction for opening a browser and accessing a URL.

9. The method for implementing automatic installation of a key device of claim 7, wherein if the pre-stored script instruction for running the installation program is a command line instruction for trying to run the installation program, then:
after the declaring, by the key device, to the computer that the key device itself is a compound device containing a USB keyboard device, the method further comprises:
determining, by the key device, whether running of the installation program is finished by an autorun program, and if so, the computer sends a device type switching instruction to the key device, and the key device switches, upon receiving the device type switching instruction, its device descriptor to the device descriptor required for the normal operation, reports to the computer a message that a device for the normal operation is inserted, declares that the key device itself is a device corresponding to the message that the device for the normal operation is inserted, and goes into a normal operation mode;
otherwise, a subsequent step that the key device sends the predefined first keyboard message sequence to the computer is executed.

10. The method for implementing automatic installation of a key device of claim 1, wherein the predefined third keyboard message sequence is a keyboard message sequence converted from a script for trying to activate the installation program and comprises:
a keyboard message sequence converted from a confirmation key command; or
a keyboard message sequence converted from a command for running the installation program, with a script for trying to activate the installation program being stored in the computer.

11. A system for implementing automatic installation of a key device, wherein the system comprises a key device and a computer;
the key device comprises a communication unit, a declaring unit, a storing unit and a sending unit, wherein
the communication unit is for the key device to establish a connection with the computer, wherein an autorun function is shielded from an operation system of the computer;
the declaring unit is for the key device to declare to the computer that the key device itself is a compound device containing a USB keyboard device;
the storing unit is for pre-storing a script instruction for running an installation program; and
the sending unit is for the key device to send a predefined first keyboard message sequence to the computer, wherein the predefined first keyboard message sequence is used by the computer for starting an operation environment of the computer; and for the key device to convert the script instruction for running the installation program pre-stored in the storing unit into a second keyboard message sequence, and to send the second keyboard message sequence to the computer; and for the key device to send a predefined third keyboard message sequence to the computer, wherein the third keyboard message sequence is used by the computer for instructing to run the installation program according to the second keyboard message sequence; and the computer comprises a communication unit, a receiving unit and a processing unit, wherein
the communication unit is for the computer to establish a connection with the key device;
the receiving unit is for receiving the first keyboard message sequence, the second keyboard message sequence and the third keyboard message sequence sent by the sending unit of the key device; and
the processing unit is for executing corresponding operations according to the keyboard message sequences received by the receiving unit.

12. The system for implementing automatic installation of a key device of claim 11, wherein the storing unit is for storing a command line instruction for trying to run the installation program; or for storing a batch processing script for trying to run the installation program; or for storing binary codes compiled from the installation program; or for storing a command line instruction for opening a browser and accessing a URL.

13. The system for implementing automatic installation of a key device of claim 12, wherein if the command line instruction for trying to run the installation program is stored in the storing unit, the key device further comprises a determining unit for determining whether running of the installation program is finished.

14. The system for implementing automatic installation of a key device of claim 13, wherein the determining unit is for determining whether the running of the installation program is finished by an autorun program, wherein if a predetermined first installation finished message is received within a predetermined first time period before the sending unit sends a first keyboard message sequence, it is determined that the running of the installation program is finished by the autorun program; and for determining whether the running of the installation program is finished by the keyboard message sequence, wherein if a predetermined second installation finished message is received within a predetermined second time period after the sending unit sends the first keyboard message sequence, it is determined that the installation program is finished by the keyboard message sequence.

15. The system for implementing automatic installation of a key device of claim 11, wherein the key device further comprises:
a switching unit for switching, upon receiving a device type switching instruction sent by the computer, a device descriptor of the key device to a device descriptor required for a normal operation when executing an application after the running of the installation program is finished; and
a reporting unit for reporting to the computer a message that a device for a normal operation is inserted, and declaring to the computer that the key device itself is a device corresponding to the message that the device for the normal operation is inserted.

* * * * *